UNITED STATES PATENT OFFICE.

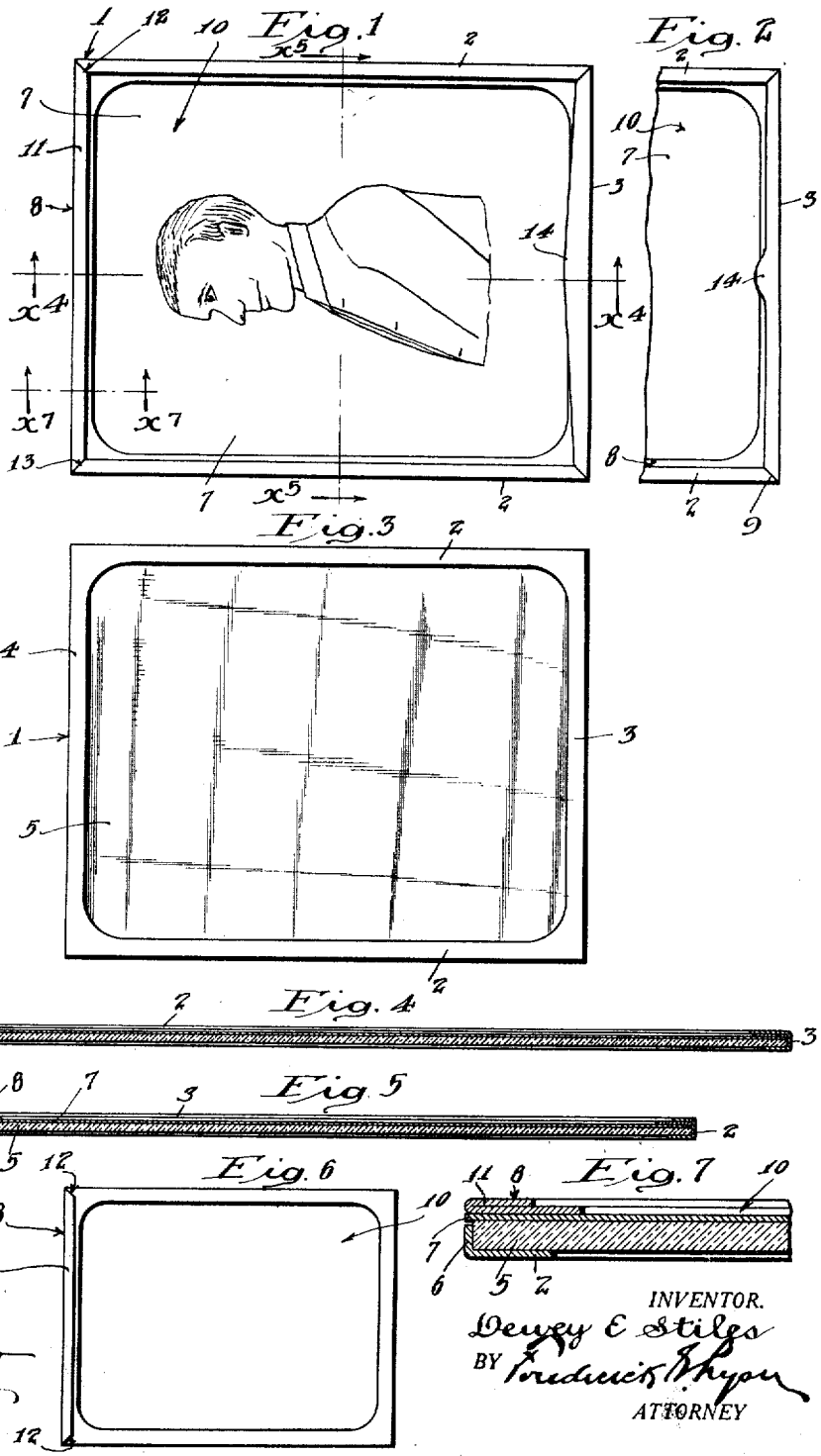

DEWEY E. STILES, OF LOS ANGELES, CALIFORNIA.

FILM-RETOUCHING HOLDER.

1,352,037.  Specification of Letters Patent.  Patented Sept. 7, 1920.

Application filed July 21, 1919. Serial No. 312,306.

*To all whom it may concern:*

Be it known that I, DEWEY E. STILES, a citizen of the United States, residing at Los Angeles, in the county of Los Angeles and State of California, have invented a new and useful Film-Retouching Holder, of which the following is a specification.

This invention pertains to means whereby a photographic negative film is held while the retoucher is working on the film, and an object of the invention is to provide a holder of this description in which the film can be readily placed and from which the film can be quickly removed.

Another object is to so construct the holder that the metal parts thereof may be made from but two pieces of sheet metal.

Another object is to make provision for holding a film perfectly flat upon a flat surface so as to facilitate the retouching operation.

Another object is to provide a holder that is comparatively thin.

Other objects and advantages will appear in the subjoined detailed description.

The accompanying drawings illustrate the invention.

Figure 1 is a plan view of a holder embodying the invention.

Fig. 2 is a fragmental plan view of a modification of the invention.

Fig. 3 is an inverted plan view of the holder shown in Fig. 1.

Fig. 4 is an enlarged sectional elevation on line indicated by $x^4$—$x^4$, Fig. 1.

Fig. 5 is an enlarged sectional elevation on line indicated by $x^5$—$x^5$, Fig. 1.

Fig. 6 is a reduced plan view of the slide detached.

Fig. 7 is an enlarged sectional detail on line indicated by $x^7$—$x^7$, Fig. 1.

There is provided a frame indicated in general by the character 1, said frame comprising side members 2 and end members 3, 4. The members 2, 3 are in the form of channels, and the member 4 is in the form of an angle or L-shaped. Inserted in the channels 2, 3 and resting on the L-shaped member 4 is a transparent panel 5 of glass or other suitable material capable of transmitting light rays, and it is to be noted that preferably the upstanding leg 6 of the L-shaped member is narrower than the thickness of the transparent panel.

The film, to be retouched, is indicated at 7 and is adapted to lie on the upper face of the panel 5 with three of its edges inserted in the channels 2, 3. Because of the upstanding leg 6 of the L-shaped member being narrower than the panel 5, the film will not rub on the upstanding leg while said film is being inserted endwise in the frame between the channels 2. This is very important for, if the film should rub on the edge of the upstanding leg 6 it would probably be more or less scratched and such scratches would cause imperfections in the prints which are subsequently made from the film.

Insertible endwise in the frame 1 is a slide 8, the two side edges of the slide fitting in the channels 2, and one end edge of the slide fitting in the channel 3. When the slide and film are in place in the frame, the film 7 is interposed between the upper flanges of the channels 2, 3 and the upper face of the transparent panel 5.

The channels 2, 3 and L-shaped member 4, in the instance shown, are of integral construction, being bent from a single piece of material, and said material being so cut at the corners as to form miter joints 9 between the upper flanges of the channel members 2 and 3. The slide 8 is provided with an opening 10 so as to expose the film 7 through said opening, thus giving the retoucher access to the upper face of the film for performing the retouching operation thereon. One end of the slide 8 is thickened or provided with an upstanding lip 11 having beveled ends 12 adapted to engage the beveled ends 13 of the channel members 2 when the slide is in place in the frame, so as to form miter joints between the lip and frame.

The upper flange of the channel 3 projects inwardly at its middle portion farther than the end portions of said flange as indicated at 14 so as to form a tongue. In Fig. 1 the tongue 14 is gradually reduced in width from the middle portion of the member 3 toward the ends of said member, whereas in Fig. 2, the tongue 14 merely occupies the middle portion of the member 3.

In practice, the invention operates as follows: Assuming that the panel 5 is in place in the frame and that the slide 8 is detached from the frame, a film, such as that indicated at 7, which is to be retouched is inserted at one end between the channels 2 adjacent the upstanding leg 6. Then the thin end of the slide 8 will be inserted above the film between said channels 2. Then the film and slide will be grasped and held together and the slide will be moved endwise toward the tongue 14. When the inner end of the slide reaches the tongue 14, if said slide should engage said tongue because of flexing upwardly of the slide or downwardly of the upper flange of the channel 3, the operator will produce pressure on that portion of the slide which is adjacent the tongue so as to depress said portion of the slide below the plane of the projection 14, whereupon the slide may be pushed into the channel 3.

At his option the user of the holder may operate the same differently than above described. For example, if it be desired, the film may be fully inserted in the frame 1 before the slide is inserted. However, by inserting the slide and film together in the frame the necessary pressure for forcing the film into place in the frame is exerted on the slide and the film need not be touched by the retoucher excepting slightly at its edges, and there is no danger of creasing, scratching or otherwise injuring the film while inserting it in the holder.

It is noted that, if it were not for the tongue 14, the inner end of the slide might come into contact for a considerable distance with the inner edge of the upper flange of the channel 3, thus making it very inconvenient for the operator to depress the slide sufficiently throughout the length of the contact to relieve the contacting edge of the slide from engagement with said flange.

After the film has been thus placed in the holder, the retoucher may proceed with the retouching operation substantially the same as though he were retouching upon a glass plate negative, the holder with the film in place being very little thicker than such glass plate negative.

It is understood that the invention is not limited to the exact details of construction shown in the drawings and described above, but that the invention also includes such changes and modifications as lie within the spirit and scope of the appended claims.

I claim:

1. A film-retouching holder comprising a frame, a light transmitting panel in the frame, and a slide having an opening and adapted to hold a film in place on the light transmitting panel, there being no obstruction to the passage of light rays through the frame.

2. A film-retouching holder comprising a frame having side channels and an end channel and having an end L-shaped member, a light transmitting panel having its side edges inserted in the side channels and having one end edge inserted in the end channel and having its other end resting on the L-shaped member, the upright leg of the L-shaped member being narrower than the thickness of the light transmitting panel, and a slide having an opening and insertible in the channels to hold a film in place on the light transmitting panel.

3. A film-retouching holder comprising a frame having side channels and an end channel, a light transmitting panel having its side edges inserted in the side channels and having one end edge inserted in the end channel, and a slide having an opening and insertible in the channels to hold a film in place on the light transmitting panel, there being no obstruction to the passage of light rays through the frame.

4. A film-retouching holder comprising a frame having side channels and an end channel, a light transmitting panel having its side edges inserted in the side channels and having one end edge inserted in the end channel, and a slide having an opening and insertible in the channels to hold a film in place on the light transmitting panel, the upper flange of the end channel being provided near its middle with an inwardly extending tongue.

Signed at Los Angeles, California, this 16th day of July, 1919.

DEWEY E. STILES.

Witnesses:
GEORGE H. HILES,
L. BELLE WEAVER.